United States Patent [19]

Pfarrer et al.

[11] 4,066,937

[45] Jan. 3, 1978

[54] CONTROL CIRCUIT FOR A TWO SPEED SINGLE PHASE MOTOR

[75] Inventors: David M. Pfarrer, Hurst; Leonard J. Van Essen, Fort Worth, both of Tex.

[73] Assignee: Lennox Industries, Inc., Marshalltown, Iowa

[21] Appl. No.: 648,622

[22] Filed: Jan. 13, 1976

[51] Int. Cl.² ............................................... H02P 1/44
[52] U.S. Cl. ............................ 318/221 G; 318/225 R
[58] Field of Search ........... 318/220 R, 220 B, 221 R, 318/221 D, 221 A, 221 G, 225 R; 317/13; 361/11

[56] References Cited

U.S. PATENT DOCUMENTS

| | | | |
|---|---|---|---|
| 2,167,018 | 7/1939 | Wolfert | 318/221 D |
| 2,280,971 | 4/1942 | Packer | 318/221 D |
| 2,476,073 | 7/1949 | Trickey | 318/221 D |
| 2,752,548 | 6/1956 | Seely | 318/221 A |
| 3,559,016 | 1/1971 | Gertels | 318/221 D |

FOREIGN PATENT DOCUMENTS 1,178,661  1/1970  United Kingdom ............ 318/221 R

*Primary Examiner*—Gene Z. Rubinson
*Attorney, Agent, or Firm*—Allegretti, Newitt, Witcoff & McAndrews

[57] ABSTRACT

A control circuit for a two-speed single-phase motor as used in a hermetic refrigerant compressor which includes means for preventing welding of the start relay contacts of the start relay means by electrical discharge from the run capacitor. In one aspect of the invention, a discharge path is provided for the run capacitor by switches and auxiliary contactor means. In another and preferred aspect of the invention, a negative temperature coefficient thermistor is used in series with and between the start capacitor means and the start relay contacts for limiting the current to the start windings from a source of power and for limiting the current discharged into the start capacitor means from the run capacitor after the motor is deenergized.

7 Claims, 4 Drawing Figures

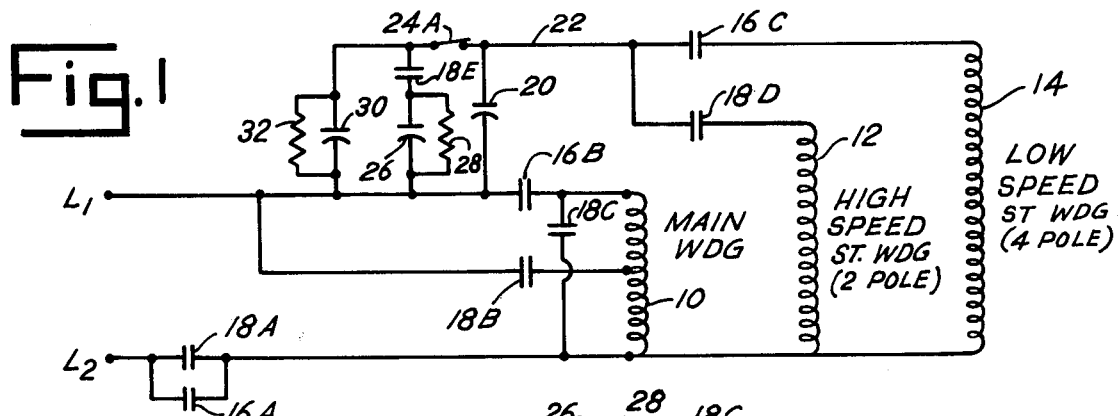
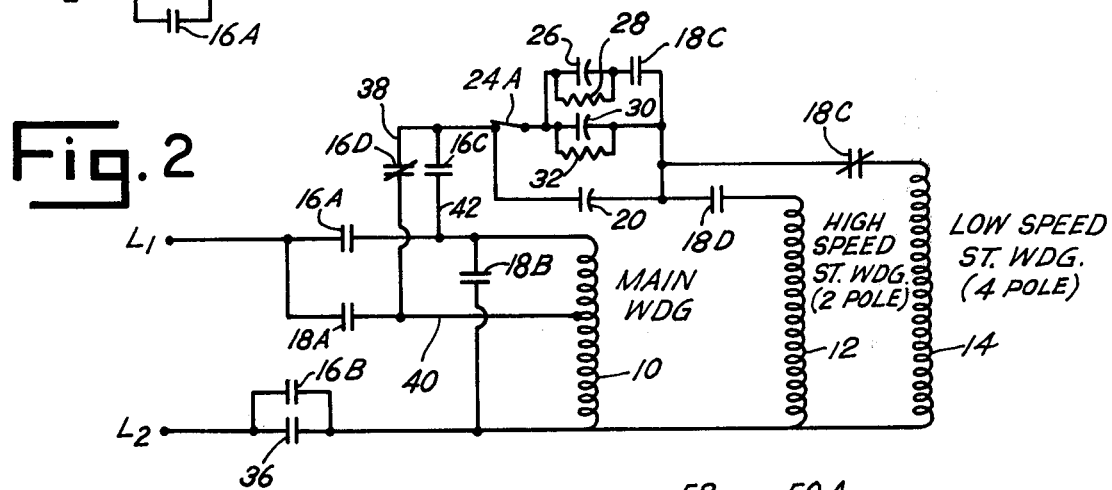
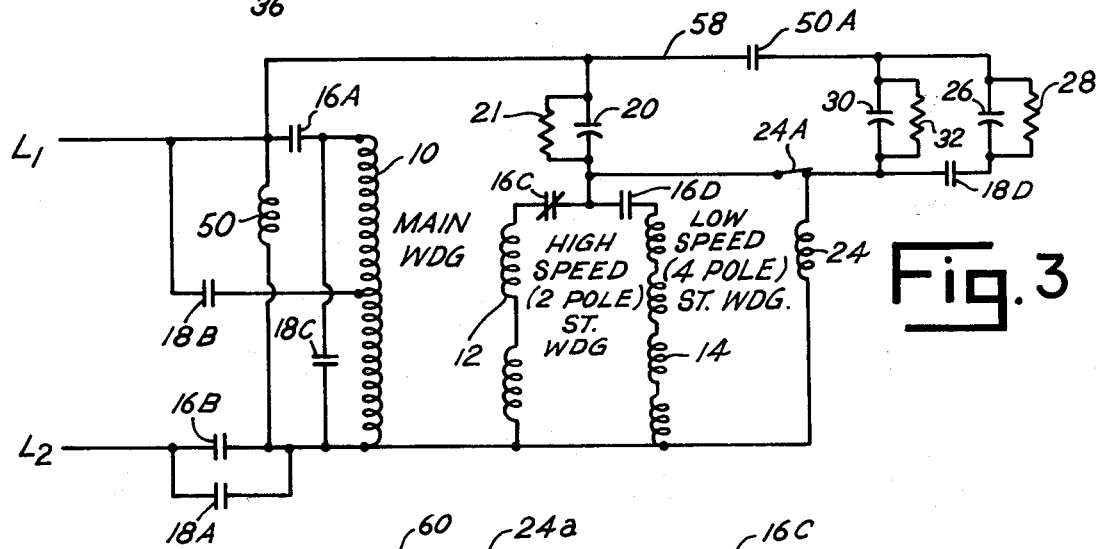
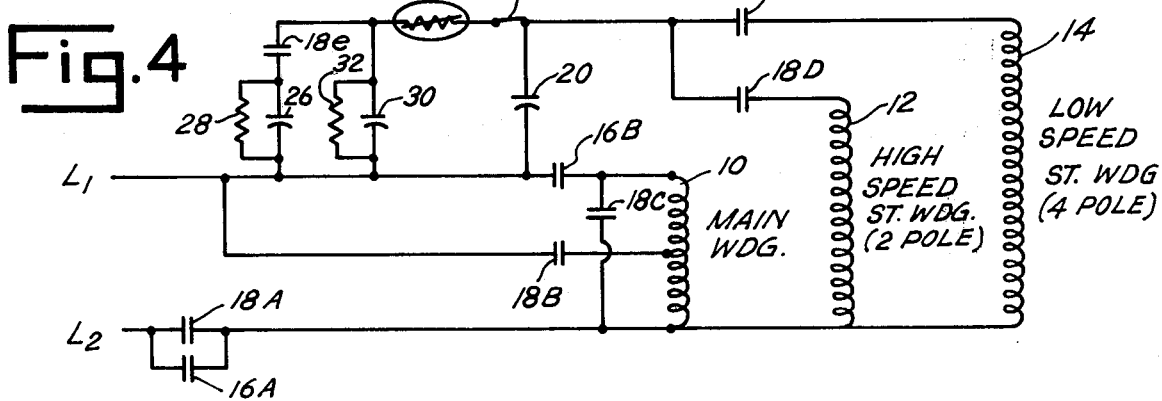

CONTROL CIRCUIT FOR A TWO SPEED SINGLE PHASE MOTOR

BACKGROUND AND SUMMARY OF THE INVENTION

This invention relates to an improved motor control means and more particularly, to an improved motor control means for a two-speed single phase refrigerant compressor motor.

Conventional single phase alternating current induction motors for driving refrigerant compressors are connected to a source of power by a line contactor. In circuit with the main motor winding and the start winding are a run capacitor and a start capacitor. A start relay including a coil in parallel with the motor start winding or windings and normally closed start relay contacts in series with the start capacitor is provided. When the contactor is energized, its contacts close. The start relay coil senses the start winding voltage and is energized at a predetermined value as the start winding voltage increases during motor acceleration. Upon attainment of the predetermined value and energization of the start relay coil, the start relay contacts open. The start capacitor is operatively removed from the circuit. Assuming that the start relay is properly sized for the application, it will stay energized during all expected load and voltage conditions.

When the line contactor is deenergized and power is removed from the motor circuit, the main winding and start winding voltages drop to zero. The start relay coil is deenergized and the start relay contacts close. If the start relay coil should happen to open when the run capacitor is fully charged, there is a large amount of energy stored in the run capacitor that can be discharged into the start capacitor when the start relay contacts close. There is sufficient energy to weld the start relay contacts and thus disable the relay for the next operation.

The start relay contact is not welded closed in practice since there is an electrical path through the main winding and start winding which allows the run capacitor to discharge before the start relay contacts close. It has been found that the start relay contacts will close in about 22 milliseconds normally and a minimum measured closure time is 17 milliseconds. The time for the run capacitor to discharge through the main winding and start winding and run capacitor in a 5-ton compressor application can be computed as follows:

$t = RC$
= (R main winding + R start winding )(C run capacitance)
= (0.3 − 2.0)(55 × $10^{-6}$)
= 2.3 × 55 × $10^{-6}$
= 0.127 milliseconds to discharge to 37 percent of the original voltage level.

From the foregoing, it is seen that the run capacitor will be discharged long before the start relay contacts close (0.127 milliseconds being much less than 17 milliseconds).

Applying the conventional single phase single speed motor control to a single phase two speed motor results in an arrangement lacking a discharge path for the run capacitor and therefore, the run capacitor can discharge through the start relay contacts to the start capacitors and thus weld the start relay contacts closed.

An object of this invention is to provide an improved motor control for single phase two speed motors which will overcome the problem of the welding of the start relay contacts in an effective and relatively inexpensive fashion.

Another object of this invention is to provide an improved motor control for a single phase two speed motor for a refrigerant compressor which incorporates a negative temperature coefficient thermistor for properly and economically controlling the discharge of the run capacitor so as to prevent welding of the start relay contacts.

Other objects and advantages of the present invention will be made more apparent hereinafter.

BRIEF DESCRIPTION OF THE DRAWING

FIG. 1 is an electrical circuit diagram of a two-speed single-phase motor circuit adapted from a conventional capacitor-start capacitor-run induction motor circuit in which the start relay contacts will be welded in use;

FIG. 2 is an electrical schematic circuit diagram of a two-speed single-phase motor circuit embodying principles of the present invention;

FIG. 3 is a modified electrical schematic circuit diagram illustrating a first modified circuit; and FIG. 4 is a second modified electrical schematic circuit diagram of a two-speed single-phase motor circuit embodying a negative temperature coefficient thermistor.

DETAILED DESCRIPTION OF THE PRESENT INVENTION

Referring to FIG. 1, there is illustrated a circuit for a single-phase two-speed alternating current induction motor patterned after the conventional single-phase single speed alternating current induction motor embodying a run capacitor, a start capacitor, and a start relay including contacts associated with the start capacitor. Power is supplied to the circuit from a suitable source through lines L1, L2. The motor includes a main winding 10, a high speed start winding 12, and low speed start winding 14. The low speed line contactor includes contacts 16A, 16B and 16C. The high speed line contactor includes contacts 18A, 18B, 18C, 18D and 18E. The run capacitor 20 is connected across the lead line L1 and the line 22. A relay coil (not shown) is connected across the start windings and a normally closed contact 24A is provided in the line 22. Also connected between the lead line L1 and the line 22 is a start capacitor 26 in series with the contact 18E. A bleed resistor 28 is provided in parallel with the capacitor 26. Disposed in parallel with the start capacitor 26 is a start capacitor 30 which also has a bleed resistor 32 in parallel therewith. The capacitance of the start capacitors is much larger than that of the run capacitor. The bleed resistors may be on the order of 15K (15,000) ohms in one embodiment of the circuit of FIG. 1.

During low speed operation, the low speed line contactor will be energized and contacts 16A, 16B and 16C will be closed. The low speed start winding 14 will be energized. The main winding will be energized through lead line L1, contact 16A, contact 16B and lead line L2. As the voltage in the low speed start winding increases during motor acceleration, the relay (not shown) will be energized at a predetermined value, and the contact 24A will be opened, removing the start capacitor 30 from the circuit.

In a similar fashion, when the high speed line contactor is energized, the normally open contacts 18A, 18B, 18C, 18D and 18E are closed and the high speed start winding 12 will be energized. The main winding will be energized and rotation of the rotor will commence. As the voltage increases in the high speed start winding 12 during motor acceleration, the relay coil (not shown) will be energized and at a predetermined value, the contact 24A will be opened so as to remove the start capacitor 40 from the circuit.

When power is removed, contacts 16C and 18D are both opened, thus opening the start windings 12 and 14 from the run capacitors. Contacts 18A, 18B and 18C all open and this opens the main winding circuit from the circuit of run capacitor 20. There is no discharge path for the run capacitor 20 through the motor windings and it is free to discharge through contacts 24A to the start capacitors 26, 30 and thus, weld the contacts 24A.

Referring now to FIG. 2, there is shown an improved circuit which solves the problem of welding of the contacts 24A by permitting the discharge of the run capacitor 20 through utilization of additional contacts and an additional contactor. Basically, the circuit of FIG. 2, incorporates the same high speed contactor contacts 18A, B, C, D and E, however, another contact 16D is added to the low speed contactor and a one-pole power contactor of the same rating as the high speed contactor is added to the circuit together with its contact 36. The contact 36 is disposed in the lead line L2, with the contact 16B in parallel therewith. The normally closed contact 16D is disposed in the line 38 which is connected between the line 40 and a terminus of line 42 within which is disposed the contact 16C. During low speed operation, the low speed contactor is energized and the normally open contacts 16A, 16B and 16C are closed and the normally closed contact 16D is opened. A circuit is completed from lead line L1 through contact 16A, contact 16C, normally closed contact 24, capacitor 30, normally closed contact 18C, low speed start winding 14, contact 16B and lead line L2 to energize the low speed start winding 14.

When the voltage in the low speed start winding 14 approaches a predetermined value, during motor acceleration, the contacts 24 will be open removing the start capacitor 30 from the circuit. The circuit to the main winding 10 is through the lead line L1, contacts 16A, contacts 16D, main winding 10, contact 16B and lead line L2.

When the low speed line contactor is deenergized, power is removed from the motor and the start winding voltage drops to zero. The start relay coil is deenergized and the contacts 24A close. A discharge path from the run capacitor 20 is provided through the line 38, contacts 16D to the mainwinding 10, obviating welding of the contacts 24A.

For high speed operation, the high speed contactor will be energized and normally open contacts 18A, 18B, 18D and 18E will be closed and contact 18C will be opened. The high speed start winding 12 will be energized through start capacitor 26. When the high speed contactor is deenergized, the same discharge path will be provided as noted with respect to low speed operation. This solution, though satisfactory, requires an additional contact on the high speed contactor, as well as an additional one pole power contactor of the same rating as the high speed contactor. The cost of these switches or contacts and relays including the switch gear wiring is relatively expensive.

Turning now to FIG. 3, there is illustrated a modified circuit embodying principles of the present invention. Basically, instead of providing a discharge path as in the embodiment of FIG. 2, there is provided an additional relay which, upon removal of power from the motor, opens the discharge path to the start capacitors. The circuit incorporates a bleed resistor in parallel with the run capacitor 20 so as to allow discharge of the run capacitor during the off cycle of the motor. Briefly, the auxiliary relay coil 50 is disposed between lead lines L1 and L2 and its normally open contact 50A is provided in the line 58. Bleed resistor 21 is provided in parallel with the run capacitor 20. The relay coil 24 is provided in a line parallel to the low speed start winding coil 14 for actuating the normally closed contact 24A.

During low speed operation, the low speed contactor will be energized and contacts 16A, 16B and 16D will be closed and contact 16C will be open. A circuit is completed through the auxiliary relay coil 50 and contact 50A will be closed. Power is then supplied to the low speed start winding 14 through lead line L1, contact 50A, start capacitor 30, normally closed contact 24A, contact 16D, start winding 14, contact 16B and lead line L2. Start relay 24 will sense the motor start winding voltage and will be energized at a predetermined value as the start winding voltage increases during motor acceleration. At the predetermined value, the contact 24A will be opened, removing the start capacitor 30 from the circuit. The low speed start winding 14 will thus be energized from lead line L1 through the run capacitor and the motor will operate in a normal fashion.

When the low speed contactor is deenergized, the contacts 16A, 16B, 16D will be opened and the contact 16C will be closed. The bleed resistor 21 is properly sized so that a discharge path will be provided during the off cycle for the run capacitor 20.

During high speed operation, contacts 18A, 18B, 18C, 18D and 18E will be closed and contacts 16A, 16B and 16C will be open. Relay 50 is energized and contact 50A is closed. A circuit is completed through lead line L1, contact 50A the start capacitors, contact 24A, contact 16C, high speed start winding 12, contact 18A and lead line L2 to energize the winding 12. When contact 24A is opened, the start capacitors 26, 30 are taken out of the circuit and the start winding 12 circuit is completed through run capacitor 20.

The main winding 10 will be energized via lead line L1, contact 18B, contact 18A and lead line L2.

When the high speed contactor is deenergized, contacts 18A, 18B, 18C and 18D will open. The main winding 10 and high speed winding 12 will be deenergized. Bleed resistor 21 will provide a discharge path for run capacitor 20.

This method is less costly than the solution in FIG. 2 because the relay 50 need not be rated to carry start winding current which are on the order of 6-9 amperes.

The maximum values for the bleed resistor and the discharge time constant may be calculated as follows. Assuming 500 volts rms is the maximum. For a bleed resistor of two watts, $E^2/R = (500)^2/2 = 125,000$ ohms. The time constant $t$ equals RC.

$$t = 55 \times 10^{-6} \times 125 \times 10^3 = 6.9 \text{ seconds.}$$

For a bleed resistor of 5 watts, $E^2/R = (500)^2/5 = 50,000$ ohms. For this example, the time constant $t$ equals RC = $55 \times 10^{-6} \times 50 \times 10^3 = 2.8$ seconds.

The solution of FIG. 3 is satisfactory, but it does have several disadvantages in that the contactor relay 50 must drop out and its contact 50A open faster than the contacts for the high speed contactor and low speed contactor to prevent switching of the start capacitor current. Special design problems would be necessitated.

In the event that the auxiliary relay coil were placed in the main contactor coil circuit, to accomplish the requirements stated, there would be additional switching means required in the control circuit.

A less costly and presently preferred solution is disclosed in FIG. 4. Though one approach was to provide a discharge path for the run capacitor, it was discovered a desirable economical solution would be to limit the discharge current value to a safe level that would not weld the contacts 24A of the start relay. One possible solution considered was the use of a power resistor at the place of the element 60, which will shortly be described. However, a power resistor with resistance high enough to limit the discharge current to a safe value would also reduce the effectiveness of start capacitance and therefore, reduce starting torque to unacceptable levels. Further, in the event of slow start or locked rotor condition, the duration of the current through the resistor would be such that the watt rating of the resistor would need to be very high. For example, with a 20 ampere starting current, a 1 ohm resistance would be needed to limit the current. In this example, $p = I^2R = (20)^2 = 1 = 400 \times 1 = 400$ watts. It is recognized that this wattage over a period of about 7 to 25 seconds, depending on the mode of operation, would require at least a 10 watt resistor.

We have discovered that a thermistor placed as shown in the circuit would provide more desirable characteristics. The positive temperature coefficient thermistor was unacceptable because its characteristics were opposite to those desired. The negative temperature coefficient thermistor shown at 60 had the appropriate characteristics. Considering the operation of the circuit of FIG. 4, when the low speed contactor is energized, contacts 16A, 16B and 16C are closed and power is supplied from lead line L1 through the start capacitor 30, negative temperature coefficient thermistor 60, normally closed contact 24A, contact 16C, low speed winding 14, and contact 16A to lead line L2. The main winding 10 is energized through lead line L1, contact 16B, main winding 10 and contact 16A. Thermistor 60 is at its ambient temperature state or its cold state and has a high resistance, on the order of 5 ohms. This limits the current flow and reduces the effective start capacitance and the motor starting torque. As current passes through the negative temperature coefficient thermistor 60, the thermistor 60 heats up and its resistance is reduced, allowing the starting current to increase until sufficient motor torque is developed and the motor begins to accelerate. The relay coil for contact 24A will be energized at a predetermined time during acceleration of the low speed start winding 14 and the contact 24A will be opened, thus, taking the start capacitor 30, as well as the thermistor 60 out of the circuit. The thermistor 60 will cool and its resistance will increase to its original value.

When the low speed contactor means is deenergized, contacts 16A, 16B and 16C will open and the motor is deenergized. Power is removed from the start relay coil and the contacts 24A will open. By this time, the thermistor 60 is cool and its resistance is high. Thus, there will be a limit on the amount of current that will be discharged into the start capacitor 30 from the charge stored in the run capacitor 20 through the contacts 24A. This current is limited to a value safe from welding of the contacts 24. The thermistor 60 will function similarly during high speed motor operation to limit the current discharged into the start capacitor means from the run capacitor 20 when the motor is deenergized after use.

Thus, there has been provided by the circuit of FIG. 4, a highly desirable and economical manner of overcoming the problem of welding of the start relay contacts in a two-speed single-phase motor control circuit.

Considering now more specifically, the nature of the negative temperature coefficient thermistor to be used in the novel circuit of this invention, it is noted that the thermistor must have a quick temperature response. During start up, the initial resistance must drop rapidly so that the motor torque can be restored and the motor accelerated before motor overheating prevents starting at maximum design loads. In addition to a quick temperature response, the negative temperature coefficient thermistor must drop to a level which will not effectively reduce the start current and thus the starting torque. Another factor is that the cool-down time after heating must be such that it is restored to its original temperature and resistance so that the negative coefficient temperature thermistor will limit current effectively at shut down of the motor.

Yet another important consideration is that the negative temperature coefficient thermistor must be able to withstand high wattages for the lock rotor cycle rate. This value decreases due to decreasing resistance and is not subject to conditions stated for the power resistance application considered before.

A thermistor that has been found satisfactory for use in a circuit of the present invention is Model No. 2D10,000 manufactured by NL Industries, Inc. of Muskegon, Michigan. Such a termistor has a resistance of about 5 ohms, ± 10% at 25° C. and a nominal resistance at 150° C. of 0.15 ohms.

The following test data, taken under locked rotor conditions, is indicative of the desired response for the negative temperature coefficient thermistor suitable in one embodiment of the present invention:

| Elapsed Starting Time t(sec) | Voltage Ratio $V/V_o$ Across NTC |
|---|---|
| 0.0 | 1.00 |
| 0.1 | 0.46 |
| 0.2 | 0.25 |
| 0.3 | 0.17 |
| 0.4 | 0.13 |
| 0.5 | 0.10 |
| 0.8 | 0.06 |

The test values given are for one possible solution and it should be noted that the values will change depending on motor horse power and capacitors used for various motors and that the thermistor must then be appropriately sized for various motor and capacitor combinations.

There has been provided by the present invention improved circuit for use with a two-speed single-phase motor as may be applied in a hermetic refrigerant compressor to prevent welding of the start relay contacts during operation of the compressor. The preferred embodiment incorporates a negative temperature coefficient thermistor serving with the start capacitor means and the start relay contacts and disposed between the start capacitor means and the start relay contacts.

While we have shown several embodiments of the present invention, it will be apparent to those skilled in the art that various modifications may be made thereto.

We claim:

1. For use with a single-phase two-speed motor comprising a main winding, a start winding means including a low speed start winding and a high speed start winding in circuit with the main winding and adapted to provide either a high speed operation or low speed operation, low-speed contactor means, high speed contactor means, start relay means, start capacitor means and run capacitor means, a thermistor in series with the start contacts of the start relay means for preventing welding of the start contacts of the start relay means, the start capacitor means being in parallel with the run capacitor means and the thermistor and start contacts are electrically disposed between the start capacitor means and the run capacitor means.

2. A control circuit as in claim 1 wherein the thermistor is a negative coefficient thermistor.

3. A control circuit as in claim 2 including means for providing a discharge path for the run capacitor means during the off cycle of the two-speed motor.

4. A control circuit as in claim 2 including means for limiting the current to the start windings from a source of power.

5. A control circuit as in claim 1, wherein said low speed contactor means including normally open contacts for connecting said low speed start winding in circuit with a source of power upon energization of the low speed contactor means, and said high speed contactor means including normally open contacts for connecting said high speed start winding in circuit with the source of power upon energization of the high speed contactor means.

6. A control circuit as in claim 5 wherein the start capacitor means includes a first capacitor and a second capacitor, said high speed contactor means including a normally open contact in series with the first capacitor, whereby during low speed motor operation, the second start capacitor is in the circuit to the low speed start winding and during high speed motor operation, the contact in series with the first capacitor is also in the circuit to the high speed start winding.

7. A control circuit as in claim 1 wherein said negative temperature coefficient thermistor limits the current to the start windings from a source of power and limits the current discharged into the start capacitor means from the run capacitor means when the two speed motor is deenergized after use.

* * * * *